United States Patent
Chakrabarti et al.

(10) Patent No.: US 9,443,047 B2
(45) Date of Patent: Sep. 13, 2016

(54) PHYSICAL AWARE TECHNOLOGY MAPPING IN SYNTHESIS

(71) Applicant: International Business Machines Corporation, Armonk, NY (US)

(72) Inventors: Pinaki Chakrabarti, Karnataka (IN); Christopher J. Berry, Red Hook, NY (US); Lakshmi N. Reddy, Briarcliff Manor, NY (US); Sourav Saha, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 124 days.

(21) Appl. No.: 14/288,794

(22) Filed: May 28, 2014

(65) Prior Publication Data

US 2015/0347640 A1    Dec. 3, 2015

(51) Int. Cl.
*G06F 17/50* (2006.01)

(52) U.S. Cl.
CPC .................. *G06F 17/505* (2013.01)

(58) Field of Classification Search
USPC .......................................................... 716/104
See application file for complete search history.

(56) References Cited

U.S. PATENT DOCUMENTS

| | | | |
|---|---|---|---|
| 2003/0159115 A1* | 8/2003 | Teig | G06F 17/505 716/103 |
| 2003/0217026 A1 | 11/2003 | Teig et al. | |
| 2005/0114814 A1* | 5/2005 | Correale | G06F 17/5045 716/113 |
| 2007/0220522 A1* | 9/2007 | Coene | G06F 9/5066 718/104 |
| 2008/0127000 A1 | 5/2008 | Majumder et al. | |
| 2009/0254874 A1* | 10/2009 | Bose | G06F 17/5068 716/113 |
| 2009/0271752 A1* | 10/2009 | Alpert | G06F 17/5072 716/119 |
| 2009/0319977 A1* | 12/2009 | Saxena | G06F 17/5077 716/129 |
| 2012/0159406 A1 | 6/2012 | Drumm et al. | |

FOREIGN PATENT DOCUMENTS

| | | |
|---|---|---|
| JP | 1173447 A | 3/1999 |
| JP | 2000242671 A | 9/2000 |

OTHER PUBLICATIONS

Sullivan et al., "Deterministic hardware synthesis for compiling high-level descriptions to heterogeneous reconfigurable architectures", Proceedings of the 38th Hawaii International Conference on System Sciences, 2005, pp. 1-9.
List of IBM Patents or Patent Applications Treated as Related; (Appendix P), Filed Nov. 19, 2014; 2 pages.
Christopher J. Berry et al., "Physical Aware Technology Mapping in Synthesis", U.S. Appl. No. 14/547,324, filed Nov. 19, 2014.
Christopher J. Berry et al., "Congestion Aware Layer Promotion", U.S. Appl. No. 14/542,824, filed Nov. 17, 2014.

* cited by examiner

Primary Examiner — Mohammed Alam
(74) Attorney, Agent, or Firm — Cantor Colburn LLP; Margaret McNamara

(57) ABSTRACT

A method of performing physical aware technology mapping in a logic synthesis phase of design of an integrated circuit and a system to perform physical aware technology mapping are described. The method includes subdividing a core area representing a sub-block of the integrated circuit into equal-sized grids. The method also includes determining a location of each of one or more latches in the logic design based on an algorithm, determining a location of each of one or more combinational logic gates in the logic design based on the locations of the one or more latches, and obtaining the technology mapping based on the locations of the one or more latches, one or more input ports, or one or more output ports, the locations of the one or more combinational logic gates, and associated path delays.

16 Claims, 8 Drawing Sheets

PHYSICAL AWARE TECHNOLOGY MAPPING IN SYNTHESIS

BACKGROUND

The present invention relates to integrated circuit (chip) design, and more specifically, to a technology mapping phase of a logical chip design.

Computer-aided design (CAD) tools aid in the design of circuits that will ultimately be implemented as semiconductor devices. The process of converting the logical (circuit) design to the physical realization of the design is referred to as synthesis and generally results in a gate-level placed netlist (list of connections). Within the logical design process, technology-independent logic synthesis is followed by technology mapping with standard cell library elements. This technology mapping is followed by post-technology-mapping synthesis optimization. At this stage, some of the decisions made in the technology mapping phase may be found to require rework. That is, when the technology mapping that is done with standard cell library elements is unaware of physical constraints on design, decisions made in the technology mapping phase may have to be corrected to account for physical constraints.

SUMMARY

According to one embodiment of the present invention, a method of performing physical aware technology mapping in a logic synthesis phase of design of an integrated circuit includes subdividing a core area representing a sub-block of the integrated circuit into equal-sized grids, the core area including one or more input ports and one or more output ports; determining, using a processor, a location of each of one or more latches in the logic design based on an algorithm; determining, using the processor, a location of each of one or more combinational logic gates in the logic design based on the locations of the one or more latches; and obtaining the technology mapping based on the locations of the one or more latches, the one or more input ports, or the one or more output ports, the locations of the one or more combinational logic gates, and associated path delays.

According to another embodiment of the invention, a computer program product stores instructions which, when processed by a processor, cause the processor to implement a method of performing physical aware technology mapping in a logic synthesis phase of design of an integrated circuit. The method includes subdividing a core area representing a sub-block of the integrated circuit into equal-sized grids, the core area including one or more input ports and one or more output ports; determining a location of each of one or more latches in the logic design based on an algorithm; determining a location of each of one or more combinational logic gates in the logic design based on the locations of the one or more latches; and obtaining the technology mapping based on the locations of the one or more latches, the one or more input ports, or the one or more output ports, the locations of the one or more combinational logic gates, and associated path delays.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, the technology mapping phase of the logical design process in a CAD implemented synthesis may lead to the need for revisions in some of the decisions that were made. This occurs when the technology mapping is done without awareness or accounting of physical constraints on the ultimate placement and routing of chip elements and signals. For example, the technology mapping may result in a three-input NOT AND (NAND) gate being used, but the NAND gate may not be found for the standard cell library used for physical implementation. Thus, the part must be re-targeted and key properties (e.g., drive strength) must be reinitialized. As another example, the technology mapping may result in placing a cell (component) in an area that is blocked for placement. The re-targeted placement to a legal area may result in a routing delay or buffering delay that was not accounted for in the technology mapping. The Embodiments detailed herein relate to technology mapping that includes a physical awareness or awareness of the restrictions and requirements related to the physical components that will ultimately make up the chip.

Figure 1:
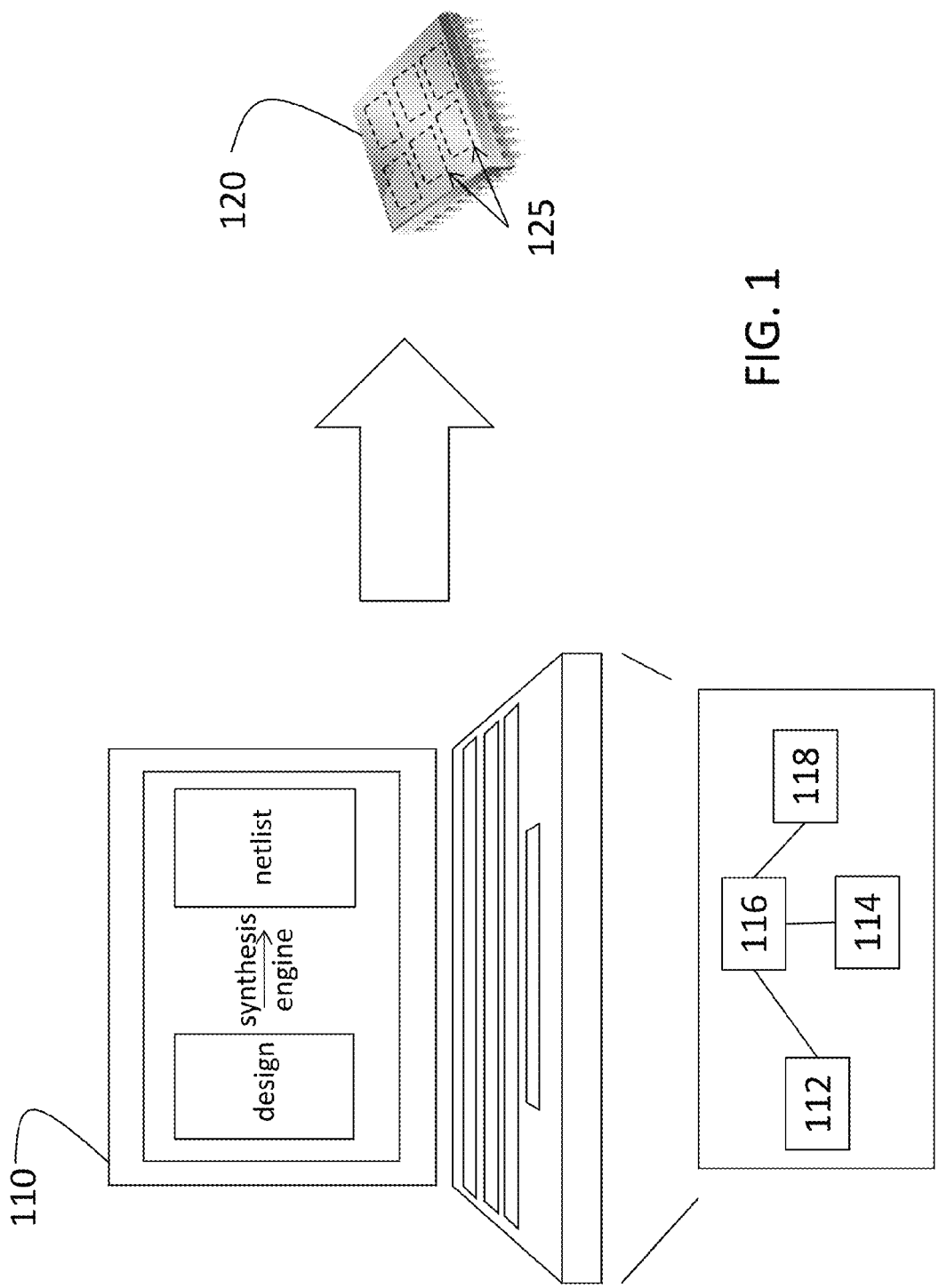
FIG. 1 is a block diagram of a system to synthesize a design for an integrated circuit according to an embodiment of the invention.

FIG. 1 is a block diagram of a system to synthesize a design for an integrated circuit according to an embodiment of the invention. A processing system 110 (e.g., computer) may implement the synthesis engine in one or more processors 116. An input interface 112 (e.g., keyboard, mouse) may be used to develop the logic design (from a register transfer level or RTL description of the design) which is stored in one or more memory devices 114 of the processing system 110. An output interface 118 (e.g., display, output port) may be used to display a netlist resulting from the synthesis or provide the information to place and route components of the physical implementation 120 (e.g., chip). The physical implementation 120 includes creating components (e.g., transistors, resistors, capacitors) and interconnections therebetween on a semiconductor (e.g., silicon wafer). The physical layout of circuit sub-blocks 125 affects the length of a connecting wire between components and, thus, the timing of signals between them, for example. The embodiments discussed below relate to computer-implemented physically aware technology mapping (in the logic synthesis phase), processed by the processor 116 based on instructions and algorithms stored in the memory device 114, for example.

Figure 2:
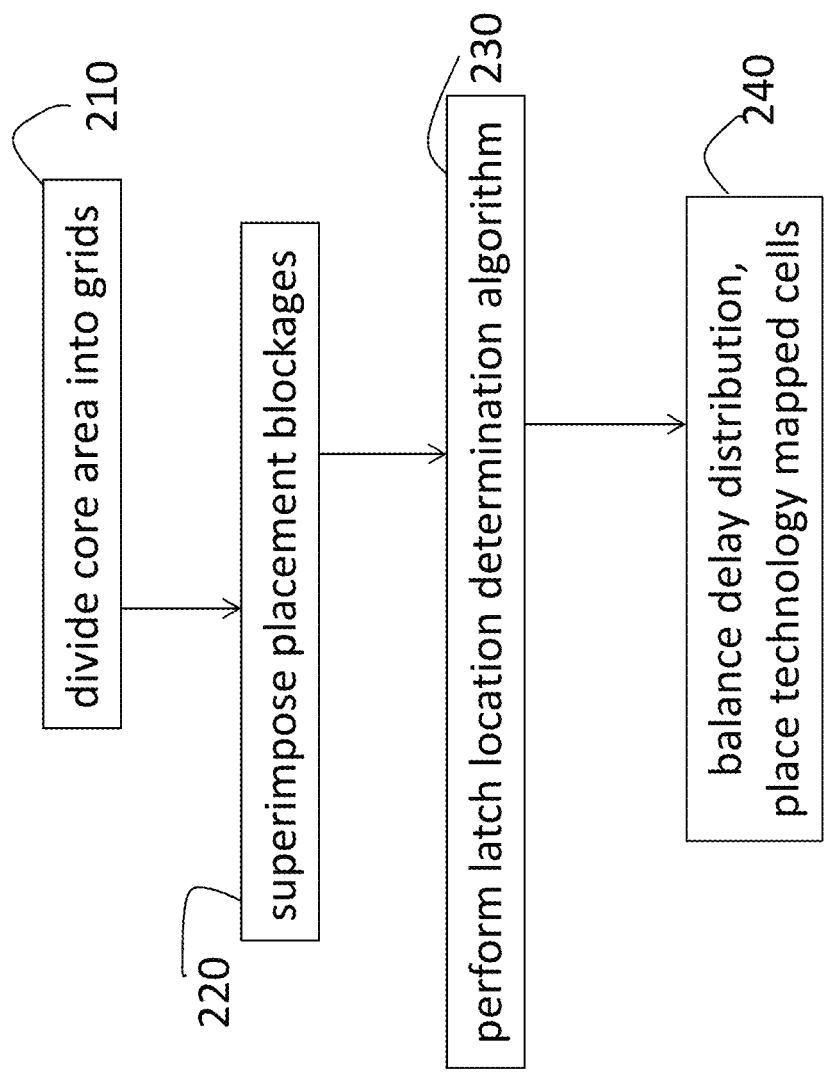
FIG. 2 is a process flow of a method of performing the technology mapping according to embodiments of the invention.
Figure 3:
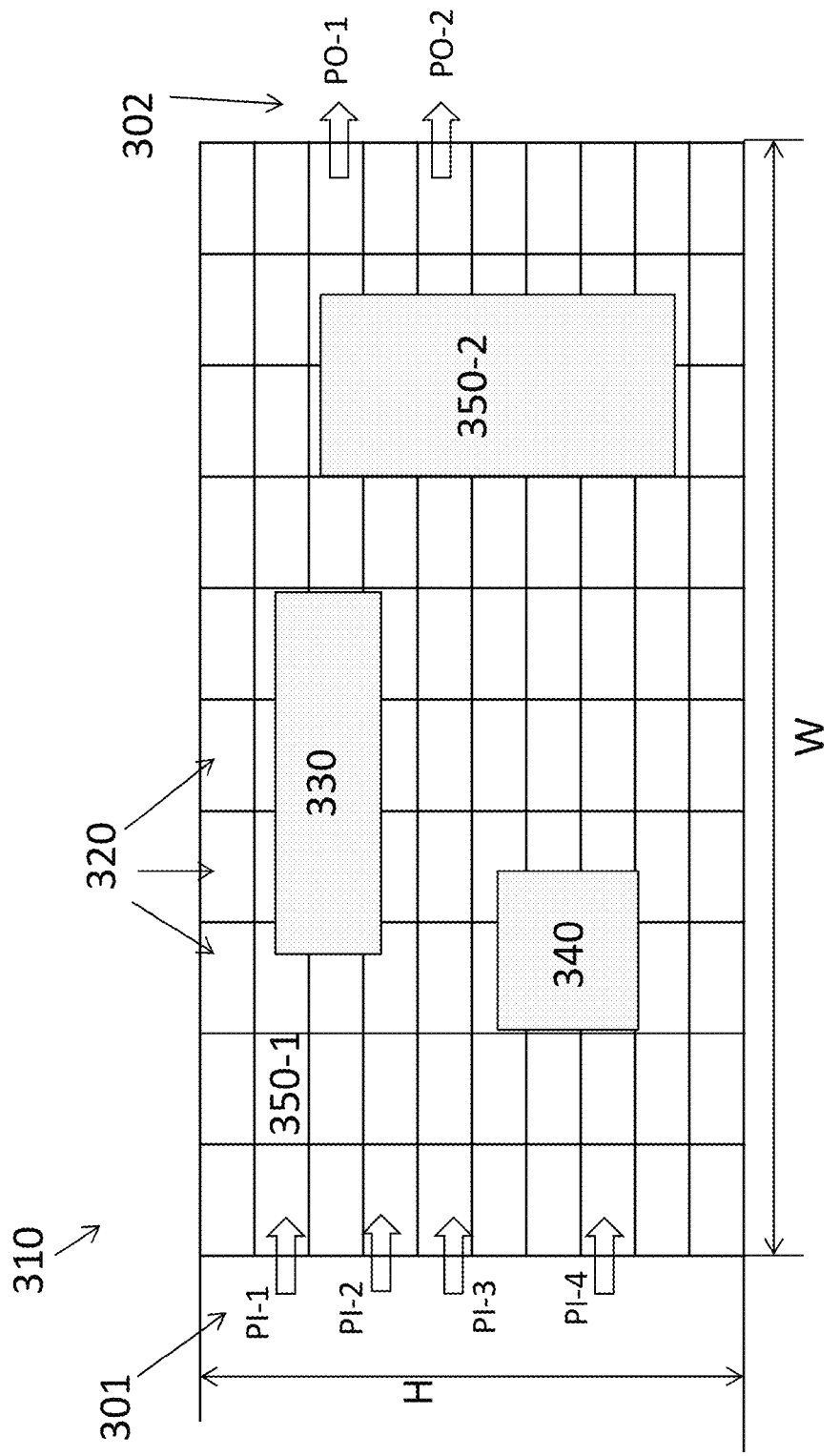
FIG. 3 illustrates an exemplary core area divided into grids according to an embodiment of the invention.

FIG. 2 is a process flow of a method of performing the technology mapping according to embodiments of the invention. Before the physically aware technology mapping is executed, the RTL description of the design is used to generate the logic design for the integrated circuit. At block 210, dividing the core area 310 into grids 320 is shown at FIG. 3. The core area 310 is a virtual representation of the physical sub-block 125 on the physical implementation 120, for example. Superimposing placement blockages, at block 220, is also illustrated in FIG. 3. Performing a latch location determination algorithm, at block 230, is detailed with reference to FIG. 4. Balancing delay distribution and placing technology mapped cells at block 240 includes a consideration involved in both latch location determination (after the algorithm provides a tentative location) and location of combinational logic gates 620 (FIG. 6) as further detailed below.

FIG. 3 illustrates an exemplary core area 310 divided into grids 320 according to an embodiment of the invention. The core area 310 is a logic phase representation of a circuit sub-block 125 with a height H and width W, where height and width are explanatory terms used to discuss the surface area of the core area 310 and do not imply any particular orientation required for the circuit sub-block 125. The core area 310 is divided into rectangular grids 320. The number of grids 320 selected reflects a level of granularity for technology mapping in the logical synthesis phase. In the example shown in FIG. 3, the core area 310 is divided into 10×10 grids 320, and each of the equally sized grids 320 has a height of H/10 and a width of W/10.

The preparatory steps of physically aware technology mapping require several inputs that are also discussed with reference to FIG. 7 below. These inputs include the register-transfer level (RTL) description of the logic, floorplan information that gives initial guidance on the physical layout, and a logical and physical library of the cells. The floorplan information includes locations of placement blockages 330 and routing blockages 340, port locations (including locations of primary input ports (PIs) 301 (FIG. 3) and primary output ports (POs) 302 (FIG. 3)), information regarding the core area 310, and voltage area 350 information, which includes the voltage area 350 boundaries and power supply information. While the PIs 301 are shown on one side of the core area 310 and the POs 302 are shown on the opposite side of the core area 310 for explanatory purposes, various PIs 301 and POs 302 may be located anywhere within the core area 310. The placement blockages 330 indicate a subset of the grids 320 of the core area 310 as blocked for placement of components. The routing blockages 340 indicate a subset of the grids 320 of the core area 310 as blocked for placement of routing wires. The routing blockages 340 can be for each individual routing layer. However, at the logical synthesis stage, to avoid too high a level of detail, a grid 320 that is blocked due to any routing blockage 340 is considered to be blocked for all routing layers. The grids 320 that overlap with a voltage area 350 are marked with a set of supply information indicating that they are open for power supplies. Superimposing the locations of placement blockages 330, routing blockages 340, and the voltage area 350 on the core area 310 (according to the process at block 220 of FIG. 2) is shown in FIG. 3. FIG. 3 illustrates two different voltage areas 350-1, 350-2. The voltage area 350-1 encompasses almost the entire design while the voltage area 350-2 is smaller.

Once the various blockages (330, 340) and voltage areas (350) are identified within the core area 310, the location of components of the circuit sub-block 125 may be approximated to avoid blocked areas (330, 340) as part of the physical aware technology mapping. This reduces or prevents the need for re-targeting and rework in the physical synthesis phase. Three different types or categories of components are each considered for placement differently. First, PIs 301 and POs 302 are in locations that are known and provided. Secondly, latches 610 (FIG. 6) are memory elements whose tentative location (prior to considering blockages (330, 340), for example) may be determined as discussed below with reference to FIG. 4. Thirdly, combinational logic gates 620 (FIG. 6) between latches 610 and between latches 610 and a PI 301 or PO 302 may be placed using the latch locations as anchors and considering a balance of path delay across the core area 310, as discussed below.

Figure 4:
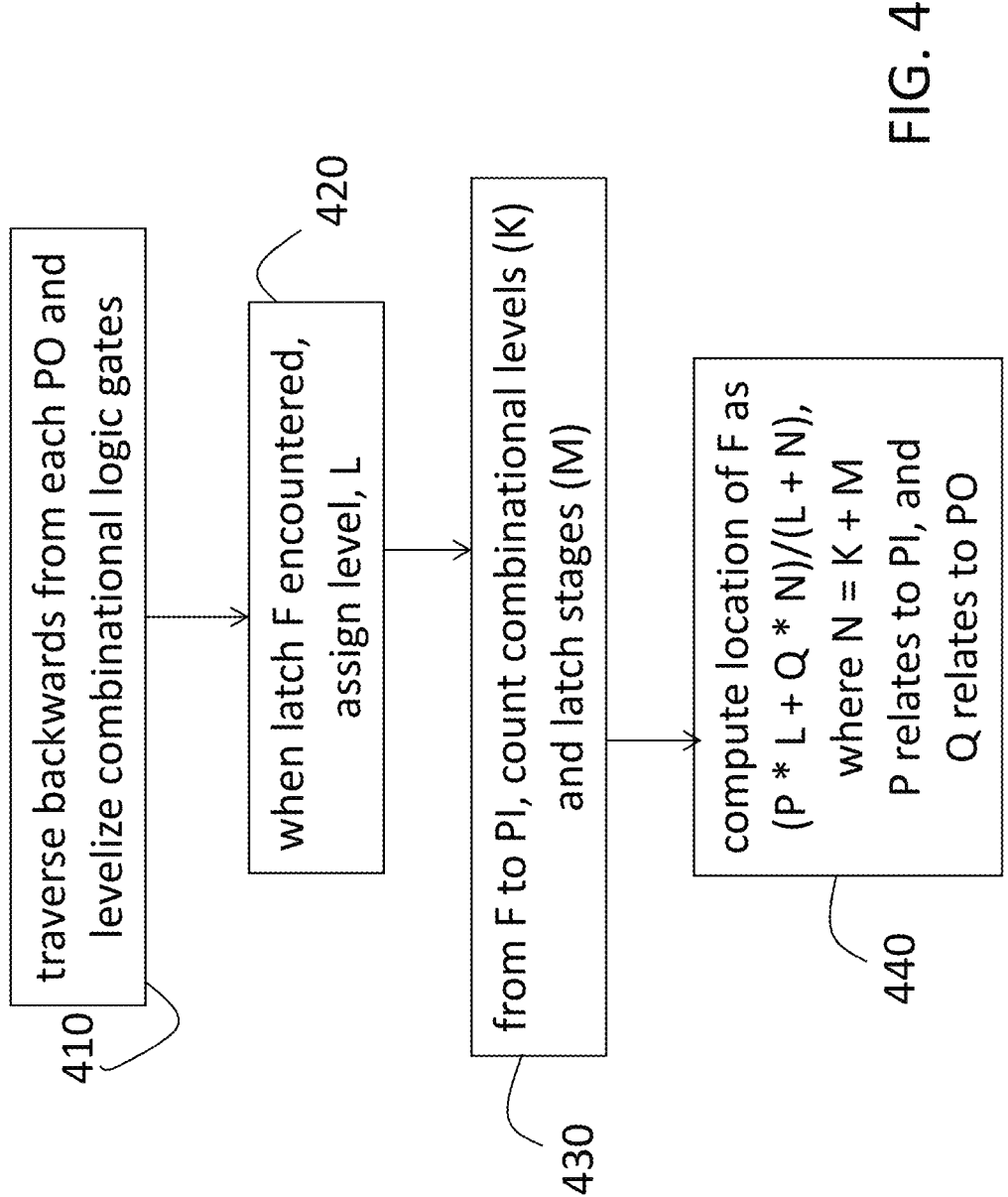
FIG. 4 illustrates the functional flow of an algorithm to compute latch location according to an embodiment of the invention.

FIG. 4 illustrates the functional flow of an algorithm to compute latch location (F) according to an embodiment of the invention. The functions described with reference to FIG. 4 use a logic design developed in the technology-independent logic synthesis phase. The logic design indicates the connections among PIs 301, combinational logic gates 620, latches 610, and POs 302 but not any locations for the components. At block 410, traversing backwards from each PO 302 and levelizing combinational logic gates 620 indicates traversing backwards across the core area 310 from a PO 302 toward a PI 301 and counting each combinational gate 620 that is encountered. When a latch 610 is encountered, assigning a level L, at block 420, includes assigning the least level hopped from PO 302 to the latch 610. From the latch 610 to PI 301, as indicated by functional block 430, counting combinational levels (combinational logic gates 620) encountered as K and counting latch stages (latches 610) encountered as M is done. The function at block 440 includes computing a location of the latch 610, F, as follows:

$$F = \frac{P*L + Q*N}{L+N} \quad [\text{EQ. 1}]$$

where N=K+M, L is the level assigned to the latch 610 F, and P and Q relate to the location of the PIs 301 and the POs 302. When the latch 610 reaches multiple PIs 301, the highest value of N is used. When the latch 610 is reached from a single PO 302 and latch 610 reaches a single PI 301, P is the location of the single PI 301, and Q is the location of the single PO 302. When latch 610 is reached from multiple POs 302 and latch 610 reaches multiple PIs 301, then P and Q represent the center of gravity of the PIs 301 and POs 302. Specifically, P is the center of gravity (mean of the locations) of the PIs 301, and Q is the center of gravity (mean of the locations) of the POs 302. The location of every latch 610 on a level is determined and then the functions (410-440) are repeated to determine a location for every latch 610 on each of the other levels, as well. It bears noting that the result of the algorithm described above is a latch location that may not be legal (open and available). That is, the computed latch location, F, is a tentative latch location. For example, the location for a given latch 610 may be determined to be within a routing blockage 340. Thus, after the tentative location is determined based on the algorithm, the latch 610 may need to be moved to the nearest legal area (grid 320) of the core area 310. As noted above, the components of the core area 310 may be divided as PIs 301 and POs 302, whose locations are provided, latches 610, whose locations are determined with the algorithm discussed above, and combinational logic gates 620. The physical aware placement of the combinational logic gates uses the locations of the latches 610 as anchor points, as discussed below.

As noted with reference to block 240 (FIG. 2), balancing delay distribution and placing technology mapped cells includes a consideration involved in both latch location determination and location of combinational logic gates 620. The consideration is of overall path delay within the core area 310. Specifically, the core area 310 is bisected and approximately half of the total path delay is mapped to each half of the core area 310. The bisection process can continue to the desired granularity to ensure that path delay is generally balanced throughout the core area 310. Thus, with the algorithm-provided locations for the latches 610 as a start, the latches 610 are mapped to nearby locations, based on blockages (330, 340) and voltage areas 350, with the additional consideration of balancing delay over the core area 310. Once the latches 610 are placed or mapped, they act as anchors for the combinational logic gates 620 which are placed with additional consideration for delay distribution.

The consideration of blocked grids (330, 340) may be formalized as a placement cost. For example, the cost associated with placement (of a latch 610 or combinational logic gate 620) in a grid 320 of the core area 310 with placement blockages 330 or routing blockages 340 may be infinity while the cost (routing and placement cost) associated with placement in an open grid may be 0. Grids 320 marked as open for power supplies are open for the placement of cells (components like combinational logic gates 620) requiring the designated power supply and open for the virtual routing of a net that has a cell at both sides with the designated power supply. When an interconnect is used between components with different voltages, a level shifter 630 (FIG. 6) must be inserted to perform the voltage conversion. The need for a level shifter 630 would not be apparent without the physical aware technology mapping that indicated that the two interconnected components were placed in different voltage areas 350. The level shifter 630 may have a base cost (e.g., the voltage difference) and a scale factor (e.g., 100), such that inserting a level shifter 630 has a cost given by, for example:

voltage_difference*100                            [EQ.2]

Figure 5:
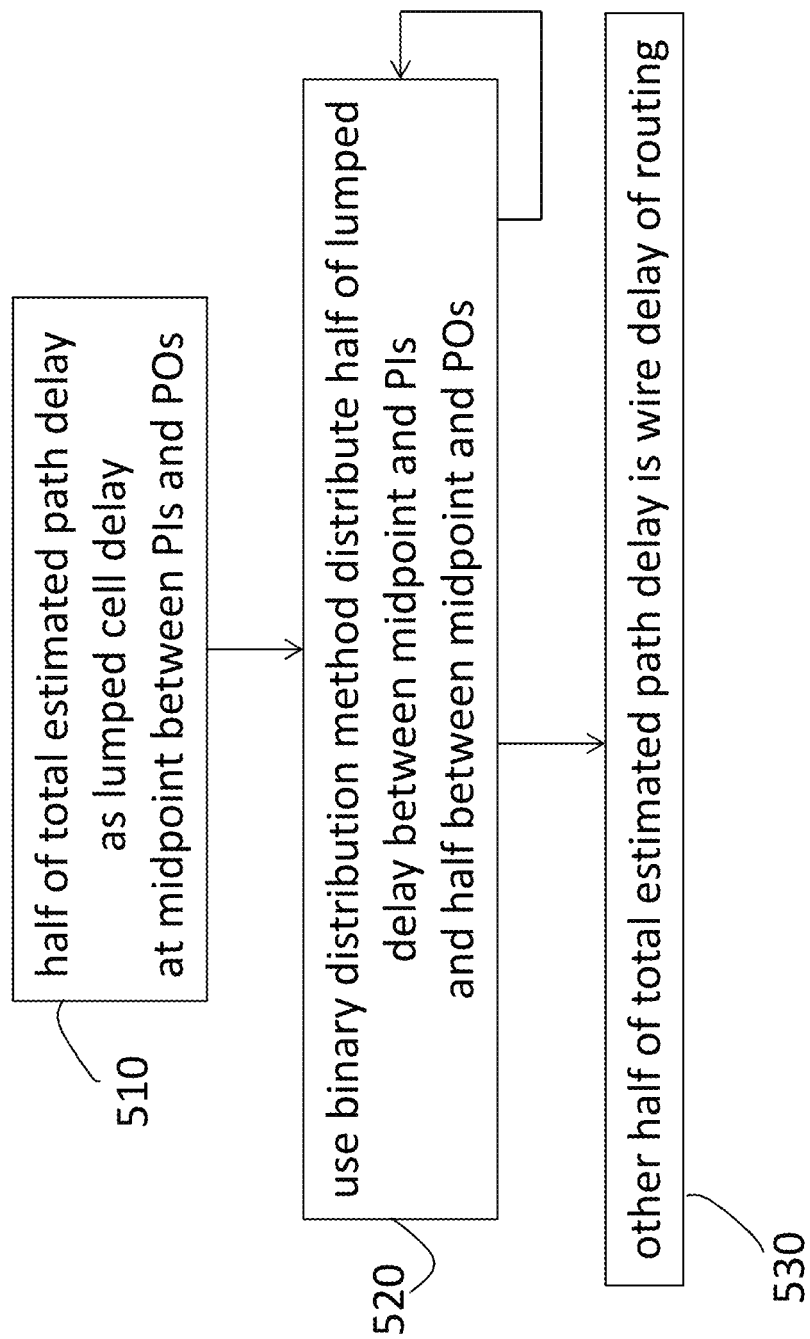
FIG. 5 is a functional flow diagram illustrating how delay distribution is balanced according to embodiments of the invention.

FIG. 5 is a functional flow diagram illustrating how delay distribution is balanced according to embodiments of the invention. The consideration of delay distribution augments the consideration of placement cost. That is, placement cost gives information about a specific grid 320 to guide the placement while delay distribution gives an overall distribution goal for cells to guide specific placement to comport with the goal. At block 510, half of the total estimated path delay over the cell area 310 is initially placed as lumped cell delay at the midpoint between the PIs 301 and POs 302. Then half of that lumped cell delay (a quarter of the total estimated path delay) is put at a midpoint between the cell area 310 midpoint and the PIs 301, and the other half of the lumped cell delay is put at a midpoint between the cell area 310 midpoint and the POs 302 using a binary distribution method at block 520. The function at block 520 is repeated for a specified number of iterations (e.g., 10) to further distribute the lumped cell delay over the core area 310. At block 530, the remaining half of the total estimated path delay is assumed to be wire delay of the virtual routing performed in the logic phase of synthesis.

Figure 6:
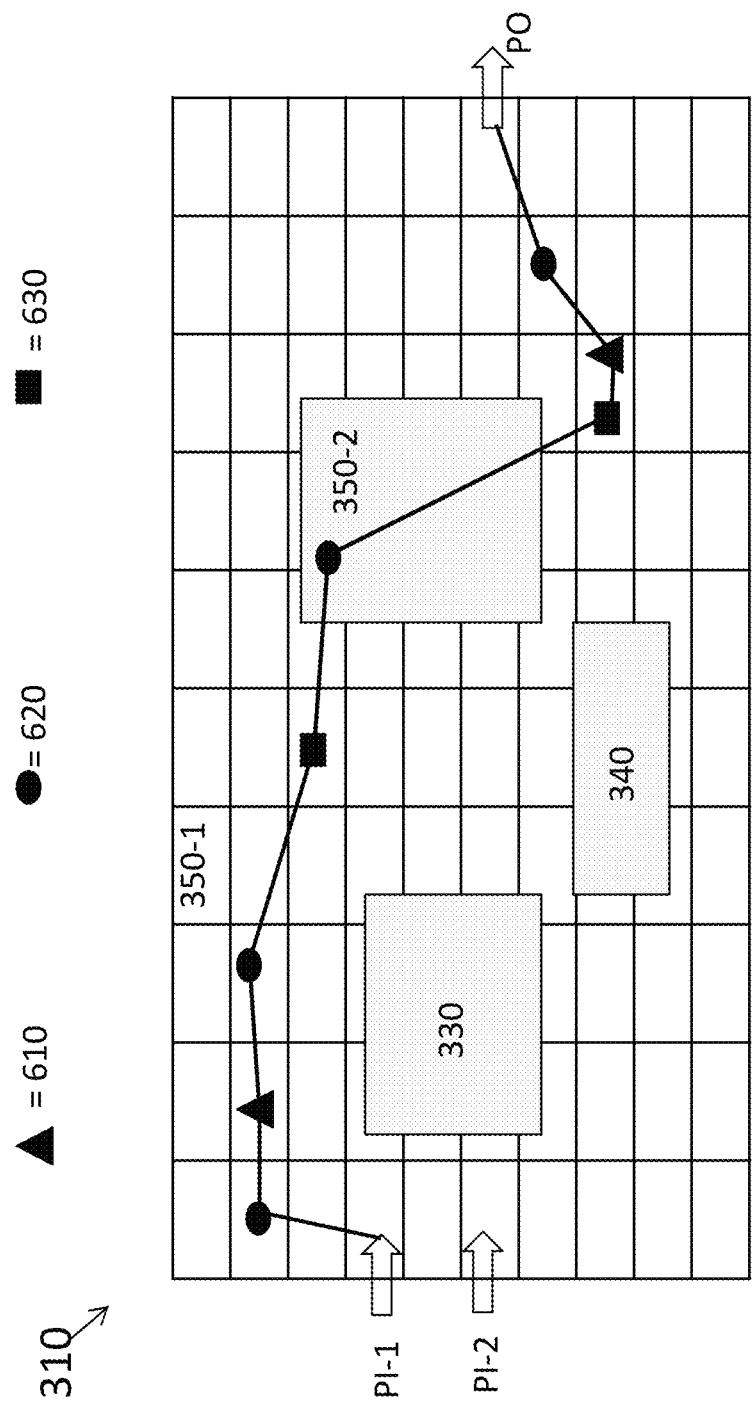
FIG. 6 illustrates an exemplary result of technology aware mapping according to embodiments of the invention.

FIG. 6 illustrates an exemplary result of technology aware mapping according to embodiments of the invention. To reiterate, the technology aware mapping is still part of the logic synthesis phase of integrated circuit (chip) design. Thus, the exemplary core area 310 shown in FIG. 6 represents a virtual placement. However, because the virtual placement considers blocked areas (330, 340), voltage areas 350, and distribution of path delay, the resulting mapping saves rework and possible inefficiencies in the physical synthesis phase of the chip design. As the example illustrates, a level shifter 630 connects two combinational logic gates 620 that are in different voltage areas 350-1 and 350-2. The descriptions provided above for generating the result shown in FIG. 6 are summarized below in FIGS. 7 and 8. In addition to delay distribution and placement costs (due to blocked grids 330, 340), grid capacity may also be considered in determining placement. For example, in determining the nearest grid 320 in which to place a latch 610 when the algorithm (discussed above with reference to FIG. 4) indicates a location that is blocked (330, 340), the capacity of the nearby grids 320 may be considered as:

$$\text{grid\_capacity} = \left(\frac{\text{grid\_area}}{\text{cell\_area}}\right) * \text{target\_utilization} \quad \quad [\text{EQ. 3}]$$

where grid_area is the area of each grid 320 being considered, cell_area is the area required by the cell (e.g., latch 610), and the target_utilization is provided along with timing restrictions.

Figure 7:
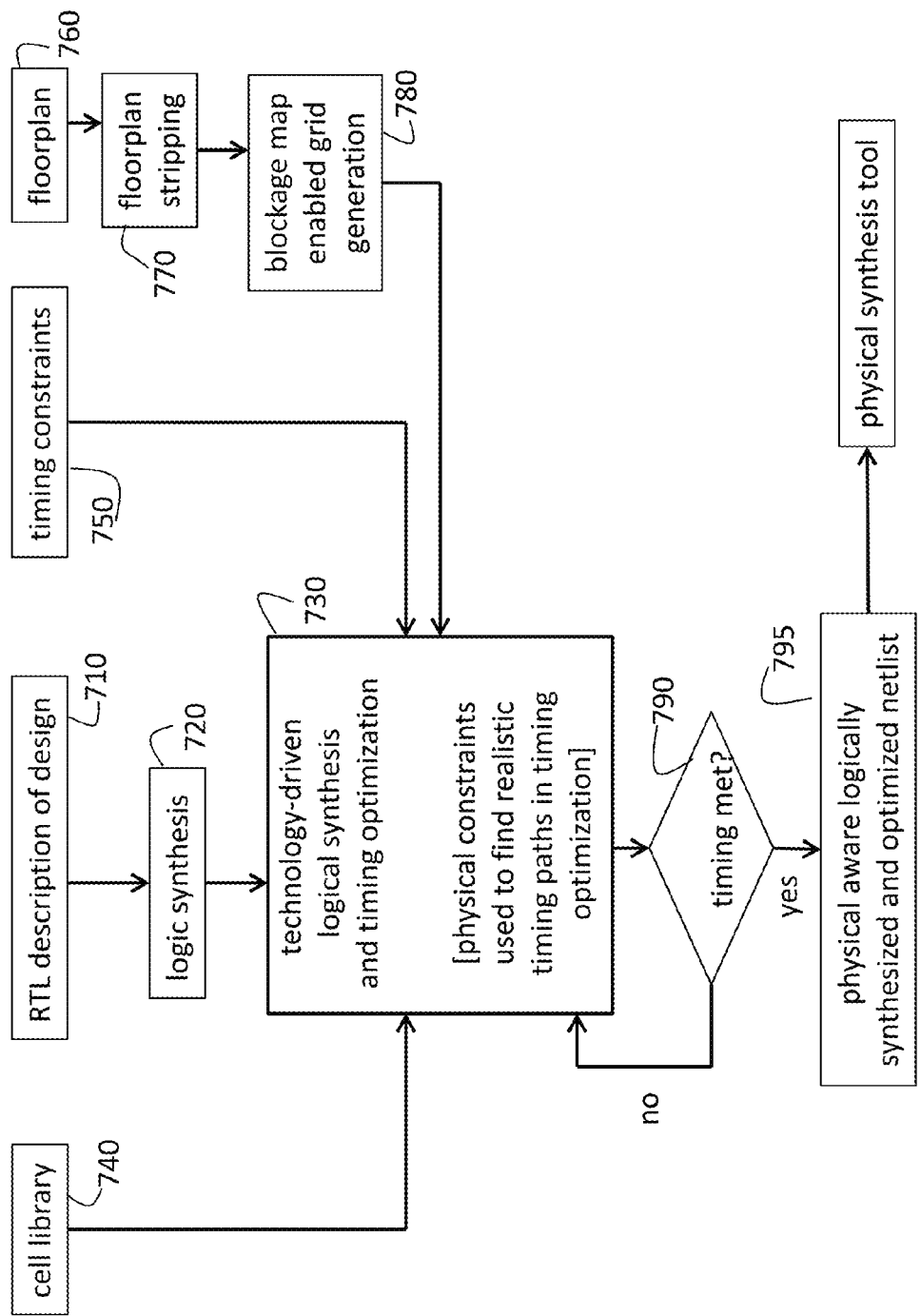
FIG. 7 is a process flow of a method of performing the logical phase of synthesis for an integrated circuit design according to embodiments of the invention.

FIG. 7 is a process flow of a method of performing the logical phase of synthesis for an integrated circuit design according to embodiments of the invention. The RTL description of the design at block 710 is used to perform logic synthesis at block 720. The logic synthesis, which indicates the latches 610, combinational logic gates 620, and the connections among them, is used to perform the physical aware or technology-driven logical synthesis and timing optimization at block 730. As noted above, this process uses several inputs. The inputs include a cell library at block 740, timing constraints at block 750, and information from a floorplan at block 760. At blocks 770 and 780, floorplan stripping and blockage (330, 340) map enabled grid generation are done as described with reference to FIG. 3 and result in grids 320 indicating blocked areas (330, 340) and voltage areas 350 as shown in FIGS. 3 and 6, for example. The technology-driven logical synthesis at block 730 includes calculating locations for the latches 610, as discussed with reference to FIG. 4, and considering distribution of path delay as well as the grid costs, as discussed with reference to FIG. 5, to complete virtual placement of cells. The process at block 730 may be repeated based on a determination, at block 790, of whether timing requirements were met. When the timing requirements are met, the physical-aware logically synthesized and optimized netlist generated at block 795 is provided to the physical synthesis tool.

Figure 8:
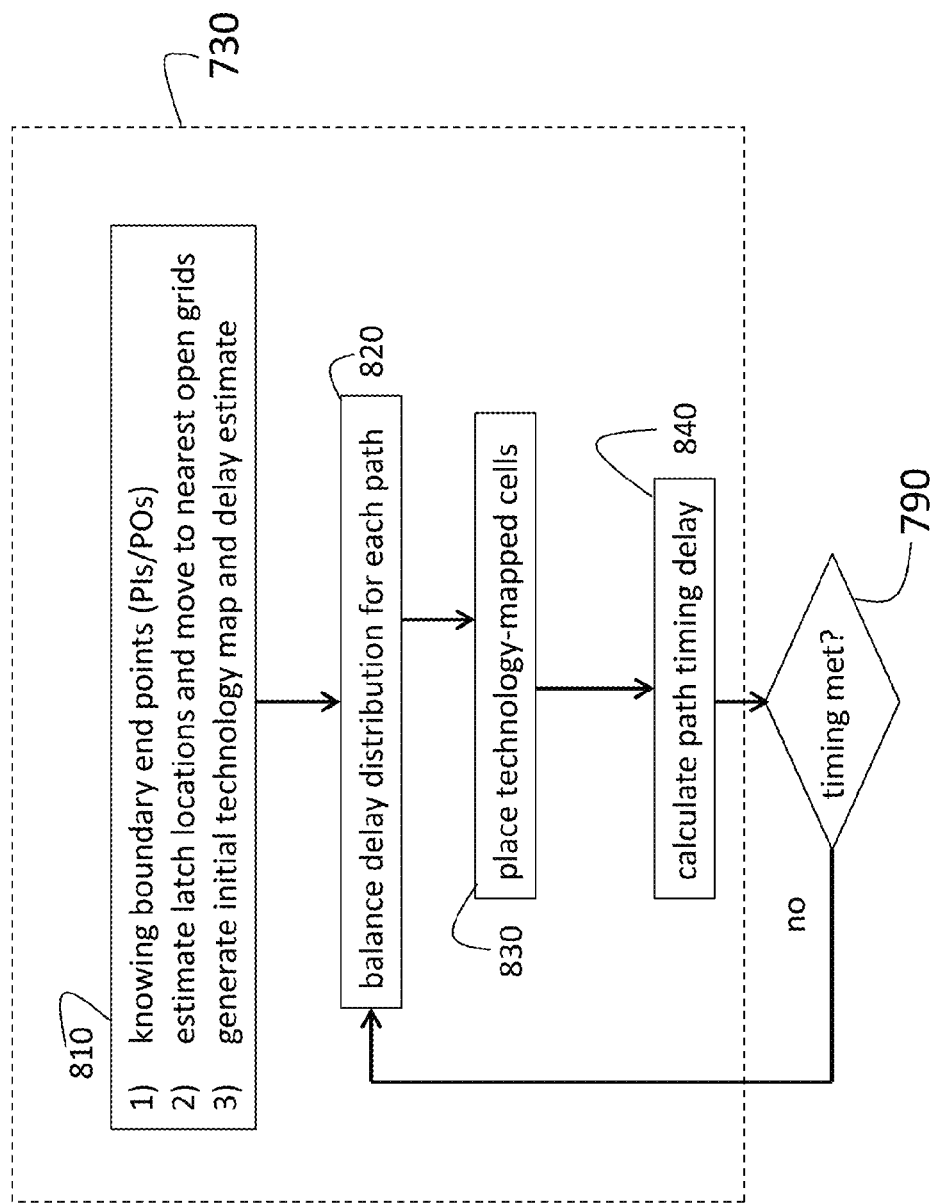
FIG. 8 is a detailed process flow diagram of the technology-driven logical synthesis and timing optimization process according to embodiments of the invention.

FIG. 8 is a detailed process flow diagram of the technology-driven logical synthesis and timing optimization process 730 (FIG. 7) according to embodiments of the invention. At block 810, because the boundary end points (locations of the PIs 301 and POs 302) for the core area 310 are provided, latch locations may be estimated and the latches 610 may then be moved to the nearest open grids 320 as discussed with reference to FIG. 4. This results in generating the initial technology map and delay estimate. Balancing delay distribution for each path, at block 820, includes processes discussed with reference to FIG. 5 and results in placement of the technology-mapped cells (e.g., combinational logic gates 620) at block 830. Calculating the path timing delay at block 840 facilitates verifying whether timing requirements have been met at block 790. When timing requirements have not been met, the delay distribution for each path is adjusted (block 820). This process is repeated until the timing requirements are met at block 790.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of performing physical aware technology mapping of a logic design to physical components in a logic synthesis phase of design of an integrated circuit, the method comprising:
    subdividing a core area representing a sub-block of the integrated circuit into equal-sized grids, the core area including one or more input ports and one or more output ports;
    determining, using a processor, a location of each of one or more latches in a logic design based on an algorithm;
    determining, using the processor, a location of each of one or more combinational logic gates in the logic design based on the locations of the one or more latches, the one or more input ports, or the one or more output ports; and
    obtaining the technology mapping based on the locations of the one or more latches, the locations of the one or more combinational logic gates, and associated path delays, wherein the determining the location of each of the one or more latches includes computing a tentative location of a latch as:

$(P*L+Q*N)/(L+N)$, where

P=a mean of locations of the one or more input ports,
Q=a mean of locations of the one or more output ports,
L=a level assigned to the latch,
N=a largest sum of the latch stages and combinational levels encountered from the latch to one of the one or more input ports.

2. The method according to claim 1, further comprising defining a first subset of the grids of the core area as blocked for placement, defining a second subset of the grids of the core area as blocked for routing, and defining one or more voltages associated with one or more of the grids of the core area.

3. The method according to claim 2, further comprising including a level shifter between two adjacent cells that include one of the one or more combinational logic elements or one of the one or more latches when one of the two adjacent cells is in a first voltage grid of the core area associated with one of the one or more voltages and another one of the two or more adjacent cells is in a second voltage grid of the core area associated with another one of the one or more voltages.

4. The method according to claim 2, further comprising defining open grids of the core area for placement as a third subset of the grids of the core area not intersecting with the first subset of the grids and the second subset of the grids.

5. The method according to claim 4, wherein the determining the location of each of the one or more latches includes calculating a tentative location of a latch based on the algorithm and determining the location of the latch as the tentative location when the tentative location is in an open grid.

6. The method according to claim 4, wherein the determining the location of each of the one or more latches includes calculating a tentative location of a latch based on the algorithm and determining the location of the latch as being in a grid among the open grids near the tentative location when the tentative location is in the first subset of the grids or the second subset of the grids.

7. The method according to claim 1, wherein the determining the location of each of the one or more combinational logic gates includes balancing a path delay across the core area.

8. The method according to claim 1, wherein the obtaining the technology mapping includes performing the determining the location of each of the one or more latches and the determining the location of each of the one or more combinational logic gates iteratively until a timing requirement is met.

9. A computer program product storing instructions which, when processed by a processor, cause the processor to implement a method of performing physical aware technology mapping of a logical design to physical components in a logic synthesis phase of design of an integrated circuit, the method comprising:

subdividing a core area representing a sub-block of the integrated circuit into equal-sized grids, the core area including one or more input ports and one or more output ports;

determining a location of each of one or more latches in a logic design based on an algorithm;

determining a location of each of one or more combinational logic gates in the logic design based on the locations of the one or more latches, the one or more input ports, or the one or more output ports; and obtaining the technology mapping based on the locations of the one or more latches, the locations of the one or more combinational logic gates, and associated path delays, wherein the determining the location of each of the one or more latches includes computing a tentative location of a latch as:

$(P*L+Q*N)/(L+N)$, where

P=a mean of locations of the one or more input ports,
Q=a mean of locations of the one or more output ports,
L=a level assigned to the latch,
N=a largest sum of the latch stages and combinational levels encountered from the latch to one of the one or more input ports.

10. The computer program product according to claim 9, the method further comprising defining a first subset of the grids of the core area as blocked for placement, defining a second subset of the grids of the core area as blocked for routing, and defining one or more voltages associated with one or more of the grids of the core area.

11. The computer program product according to claim 10, the method further comprising including a level shifter between two adjacent cells that include one of the one or more combinational logic elements or one of the one or more latches when one of the two adjacent cells is in a first voltage grid of the core area associated with one of the one or more voltages and another one of the two or more adjacent cells is in a second voltage grid of the core area associated with another one of the one or more voltages.

12. The computer program product according to claim 10, the method further comprising defining open grids of the core area for placement as a third subset of the grids of the core area not intersecting with the first subset of the grids and the second subset of the grids.

13. The computer program product according to claim 12, wherein the determining the location of each of the one or more latches includes calculating a tentative location of a latch based on the algorithm and determining the location of the latch as the tentative location when the tentative location is in an open grid.

14. The computer program product according to claim 12, wherein the determining the location of each of the one or more latches includes calculating a tentative location of a latch based on the algorithm and determining the location of the latch as being in a grid among the open grids near the tentative location when the tentative location is in the first subset of the grids or the second subset of the grids.

15. The computer program product according to claim 9, wherein the determining the location of each of the one or more combinational logic gates includes balancing a path delay across the core area.

16. The computer program product according to claim 9, wherein the obtaining the technology mapping includes performing the determining the location of each of the one or more latches and the determining the location of each of the one or more combinational logic gates iteratively until a timing requirement is met.

* * * * *